United States Patent
Hicks

(10) Patent No.: US 8,910,546 B2
(45) Date of Patent: Dec. 16, 2014

(54) TRANSMISSION ASSEMBLY INCLUDING BRAKE

(76) Inventor: Jason L. Hicks, St. Louis, MO (US)

(*) Notice: Subject to any disclaimer, the term of this patent is extended or adjusted under 35 U.S.C. 154(b) by 786 days.

(21) Appl. No.: 13/109,649

(22) Filed: May 17, 2011

(65) Prior Publication Data

US 2012/0291577 A1  Nov. 22, 2012

(51) Int. Cl.
| | |
|---|---|
| F16H 57/00 | (2012.01) |
| B60T 1/00 | (2006.01) |
| F16H 57/02 | (2012.01) |
| B60T 1/06 | (2006.01) |

(52) U.S. Cl.
CPC ............. *F16H 57/02* (2013.01); *B60T 1/062* (2013.01); *F16H 2057/02065* (2013.01)
USPC ............ 74/745; 74/411.5; 188/18 A; 192/221

(58) Field of Classification Search
CPC .......... B62L 1/00; B62L 1/005; F16D 65/12; F16D 2055/005; B62M 27/02; B62M 7/02; B60T 1/062; B60T 1/065; F16H 2057/02065; F16H 57/02
USPC ........ 74/745, 411.5; 188/18 A, 344; 192/221, 192/218, 217, 221.1
See application file for complete search history.

(56) References Cited

U.S. PATENT DOCUMENTS

| | | | | | |
|---|---|---|---|---|---|
| 2,468,367 | A | * | 4/1949 | Holderness | 180/230 |
| 3,280,933 | A | * | 10/1966 | Jones | 180/253 |
| 3,670,596 | A | * | 6/1972 | Hause | 475/66 |
| 3,955,650 | A | * | 5/1976 | Ellis | 188/71.1 |
| 4,353,569 | A | * | 10/1982 | Molina | 280/217 |
| 4,475,638 | A | * | 10/1984 | McCormick | 192/218 |
| 4,494,622 | A | * | 1/1985 | Thompson | 180/227 |
| 4,600,074 | A | * | 7/1986 | Watanabe et al. | 180/251 |
| 4,667,760 | A | * | 5/1987 | Takimoto | 180/215 |
| 4,702,340 | A | * | 10/1987 | Hamilton | 180/224 |
| 4,719,984 | A | * | 1/1988 | Watanabe | 180/226 |
| 5,992,587 | A | | 11/1999 | Maldonado | |
| 6,112,840 | A | * | 9/2000 | Forbes | 180/193 |
| 6,923,293 | B1 | * | 8/2005 | James | 188/18 A |
| 6,929,101 | B1 | | 8/2005 | Corradini | |
| 7,048,083 | B1 | | 5/2006 | Carpenter et al. | |
| 7,854,286 | B2 | | 12/2010 | Nagao et al. | |
| 7,958,799 | B1 | * | 6/2011 | Cillessen et al. | 74/348 |
| 2002/0063010 | A1 | * | 5/2002 | Morin | 180/336 |
| 2003/0006080 | A1 | | 1/2003 | Buell et al. | |
| 2003/0136612 | A1 | * | 7/2003 | Seki | 188/71.1 |
| 2003/0158012 | A1 | * | 8/2003 | Kwoka | 475/224 |
| 2004/0035629 | A1 | * | 2/2004 | Morin et al. | 180/244 |

(Continued)

*Primary Examiner* — Troy Chambers
*Assistant Examiner* — Valentin Craciun
(74) *Attorney, Agent, or Firm* — Senniger Powers LLP

(57) ABSTRACT

A motorcycle transmission assembly including a transmission housing having a hollow interior. The assembly includes a gear train having gears mounted in the hollow interior of the housing. The train includes an input operatively connectable to a motor of the motorcycle and an output operatively connectable to a drive wheel of the motorcycle. The transmission assembly includes a brake rotor having opposite faces operatively connected to the output of the gear train via at least one gear. The transmission assembly includes a brake caliper fixedly mounted with respect to the transmission housing having opposing brake pads. Each of the pads is positioned on one of the brake rotor faces. The pads are moveable between a running position in which the pads are spaced from the faces and a braking position in which the pads engage the faces to resist rotation of the gear and thereby the output.

14 Claims, 6 Drawing Sheets

(56) References Cited

U.S. PATENT DOCUMENTS

| | | |
|---|---|---|
| 2004/0159510 A1* | 8/2004 | Bergman et al. ........ 188/218 XL |
| 2005/0160848 A1* | 7/2005 | Thiessen et al. ................ 74/325 |
| 2006/0191363 A1* | 8/2006 | Thiessen et al. ................ 74/325 |
| 2007/0084693 A1* | 4/2007 | Byers ........................... 192/66.1 |
| 2007/0089942 A1 | 4/2007 | Baldwin et al. |
| 2011/0011206 A1* | 1/2011 | Knight et al. ................ 74/665 T |
| 2011/0217887 A1* | 9/2011 | Visscher .................... 440/12.67 |
| 2013/0340551 A1* | 12/2013 | Grandi ........................... 74/404 |

* cited by examiner

TRANSMISSION ASSEMBLY INCLUDING BRAKE

BACKGROUND

The present invention generally relates to a vehicle brake system and transmission, and more particularly to a motorcycle having a hidden brake system connected to a transmission.

Motorcycles are frequently customized by their owners to provide a distinctive look and pleasing appearance, and to express the creativity and taste of the owner. Such customization includes extended forks, modified frames, custom paint and coatings, distinctive wheels, varied tire widths, different seat shapes, custom fuel tank shapes, and a wide variety of handle bar and tailpipe configurations. Among the desirable customized details are removed or hidden elements. For example, removing a kickstand or hiding wiring or a fuel filter to provide a stripped down, less visually cluttered appearance are among the desirable customized details.

Modern motorcycles usually include a disc brake system on each wheel. Each brake system includes a disc fastened to the respective wheel hub, a brake caliper mounted on the frame or fork adjacent the disc, and tubing extending from the caliper to a remote reservoir and actuator. The actuator pressurizes brake fluid in the tubing to actuate the caliper so pads inside the caliper grip the disc to slow the motorcycle. Because these systems include a large disc bolted to the wheel hub, a caliper mounted adjacent the disc, and tubing extending from the caliper, their presence is visually apparent and results in a mechanically and aerodynamically cluttered appearance. Further, because motorcycles historically did not use disc brakes, their presence degrades the appeal of customized motorcycles meant to evoke vintage motorcycles.

Some prior attempts have been made to minimize the visual clutter caused by disc brake systems. For example, one manufacturer includes drum brakes inside wheel hubs to eliminate the visual clutter caused by the disc brake systems. Another manufacturer includes a disc brake system mounted adjacent a sprocket that drives a rear wheel of the motorcycle via a chain. Such changes provide visual clues how braking is accomplished limiting their appeal. For example, wheels having drum brakes also have a substantially larger hub to house the drum and shoes. Thus, these solutions have drawbacks, and there is a need to provide further customized braking systems enabling motorcycle braking without providing visual clues how braking is accomplished.

SUMMARY

The present invention relates to a motorcycle transmission assembly that includes a transmission housing having a hollow interior. The motorcycle transmission assembly also includes a gear train that includes a plurality of selectively meshable gears mounted in the hollow interior of the transmission housing. The train includes an input operatively connectable to a motor of the motorcycle and an output operatively connectable to a drive wheel of the motorcycle. The motorcycle transmission assembly further includes a brake rotor having opposite faces operatively connected to the output of the gear train via at least one gear of said plurality of gears of the train. The motorcycle transmission assembly further includes a brake caliper fixedly mounted with respect to the transmission housing having opposing brake pads. Each of the brake pads is positioned on a corresponding one of the brake rotor faces, the brake pads are selectively moveable between a running position in which the pads are spaced from the rotor faces and a braking position in which the pads engage the rotor faces to resist rotation of the gear of the plurality of gears and thereby resist rotation of the output of the gear train.

A motorcycle transmission assembly that includes a transmission housing having a hollow interior. The motorcycle transmission assembly also includes a main shaft rotatably mounted in the hollow interior of the transmission housing. The main shaft has a plurality of main shaft gears mounted thereon and an input operatively connectable to a motor of the motorcycle. The motorcycle transmission assembly further includes a counter shaft that extends parallel to the main shaft rotatably mounted in the hollow interior of the transmission housing. The counter shaft has a plurality of counter shaft gears mounted thereon. Each of the plurality of counter shaft gears is selectively meshable with the main shaft gears to change a speed ratio of the transmission. The motorcycle transmission assembly further includes an output operatively connected to a predetermined gear of the plurality of counter shaft gears. The motorcycle transmission assembly further includes a brake rotor having opposite faces operatively connected to the predetermined gear of the plurality of counter shaft gears via at least one other gear selected from the group consisting of the plurality of main shaft gears and the plurality of counter shaft gears. The motorcycle transmission assembly further includes a brake caliper fixedly mounted with respect to the transmission housing and including opposing brake pads. Each of the brake pads is positioned on a corresponding one of the brake rotor faces, the brake pads are selectively moveable between a running position in which the pads are spaced from the rotor faces and a braking position in which the pads engage the rotor faces to resist rotation of the output.

BRIEF DESCRIPTION OF THE DRAWINGS

Corresponding reference characters indicate corresponding parts throughout the drawings.

DETAILED DESCRIPTION OF THE DRAWINGS

Figure 1:
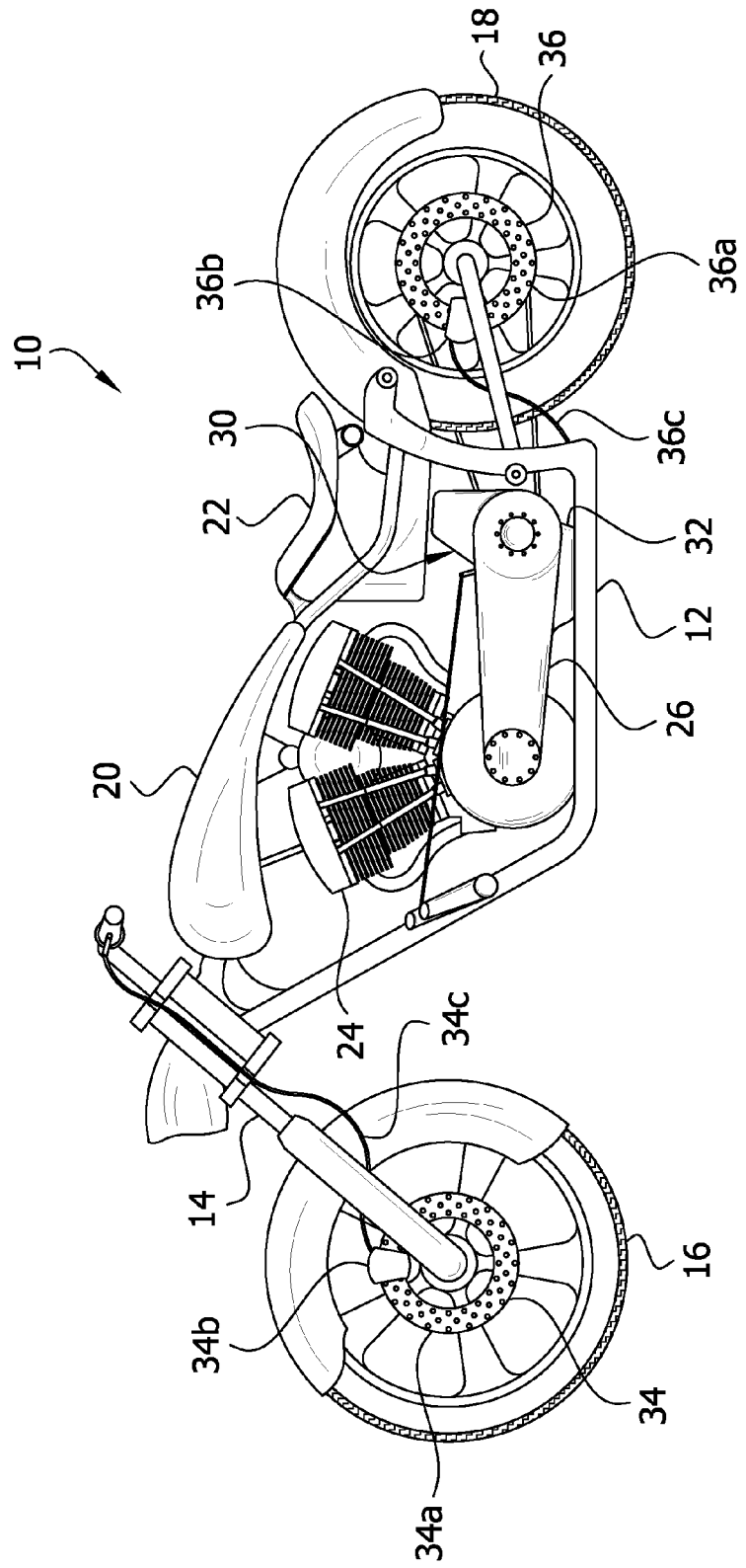
FIG. 1 is a left side elevation of a prior art motorcycle.

FIG. 1 illustrates a left side elevation of a conventional motorcycle, generally designated in its entirety by the reference number 10. The motorcycle 10 includes a frame 12 to which a fork 14 is pivotally connected. A front wheel 16 is mounted on the fork 14 and a rear drive wheel 18 is mounted on the frame 12 in a conventional manner. The motorcycle 10 also includes a fuel tank 20 and a seat 22. A motor 24 is mounted on the frame 12 below the fuel tank 20. The motor 24 drives a primary drive system, generally designated by 26, which drives a transmission, generally designated by 30, including a housing 32. A front disc brake system 34 and rear disc brake system 36 are mounted on the front and rear wheels 16, 18, respectively. Each disk brake system 34, 36 includes (respectively) a brake disc 34*a*, 36*a*, calipers 34*b*, 36*b*, and brake lines 34*c*, 36*c* leading to an actuator and a reservoir (not shown). Each disc 34*a*, 36*a* (or more broadly each brake rotor) has opposite annular faces. Each caliper 34b, 36b has opposing brake pads separated by a gap in which the respective disc 34a, 36a is positioned so one pad is positioned adjacent each face of the disc. When actuated, the caliper 34b, 36b moves the pads from a running position in which the pads are spaced from the respective rotor faces so they do not affect the rotation of the rotor to a braking position in which the pads engage the rotor faces to frictionally resist rotation of the corresponding wheel 16, 18. Because other features of the motorcycle 10 are conventional and well known to those of ordinary skill in the art, they will not be described in further detail.

Figure 2:
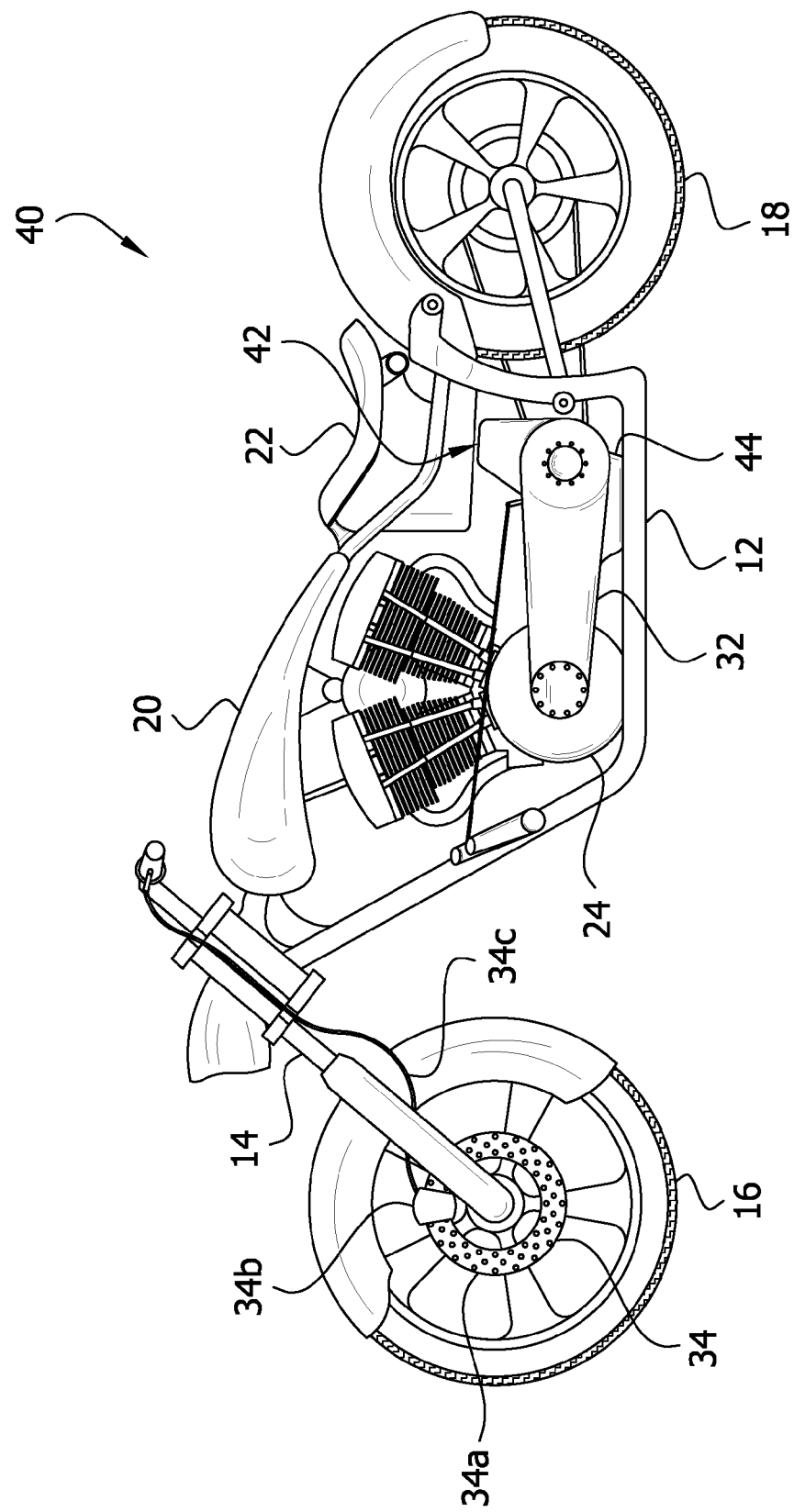
FIG. 2 is a left side elevation of a motorcycle of the present invention.

FIG. 2 illustrates a left side elevation of a motorcycle of the present invention, generally designated by 40, having a transmission assembly, generally designated by 42, including a housing 44 and a hidden brake system as will be described below. The motorcycle 40 is similar to the conventional motorcycle 10 illustrated in FIG. 1 except for a visual absence of the rear disc brake system 36. Because the rear disc brake system 36 is not visible, the motorcycle 40 has a distinctive appearance as a comparison of FIGS. 1 and 2 makes apparent. Because the other visible features of the motorcycle 40 of the present invention including the transmission assembly 42 having the hidden brake system are identical to those of the conventional motorcycle 10 shown in FIG. 1, general features of the motorcycle 40 of the present invention shown in FIG. 2 will not be described in further detail.

Figure 3:
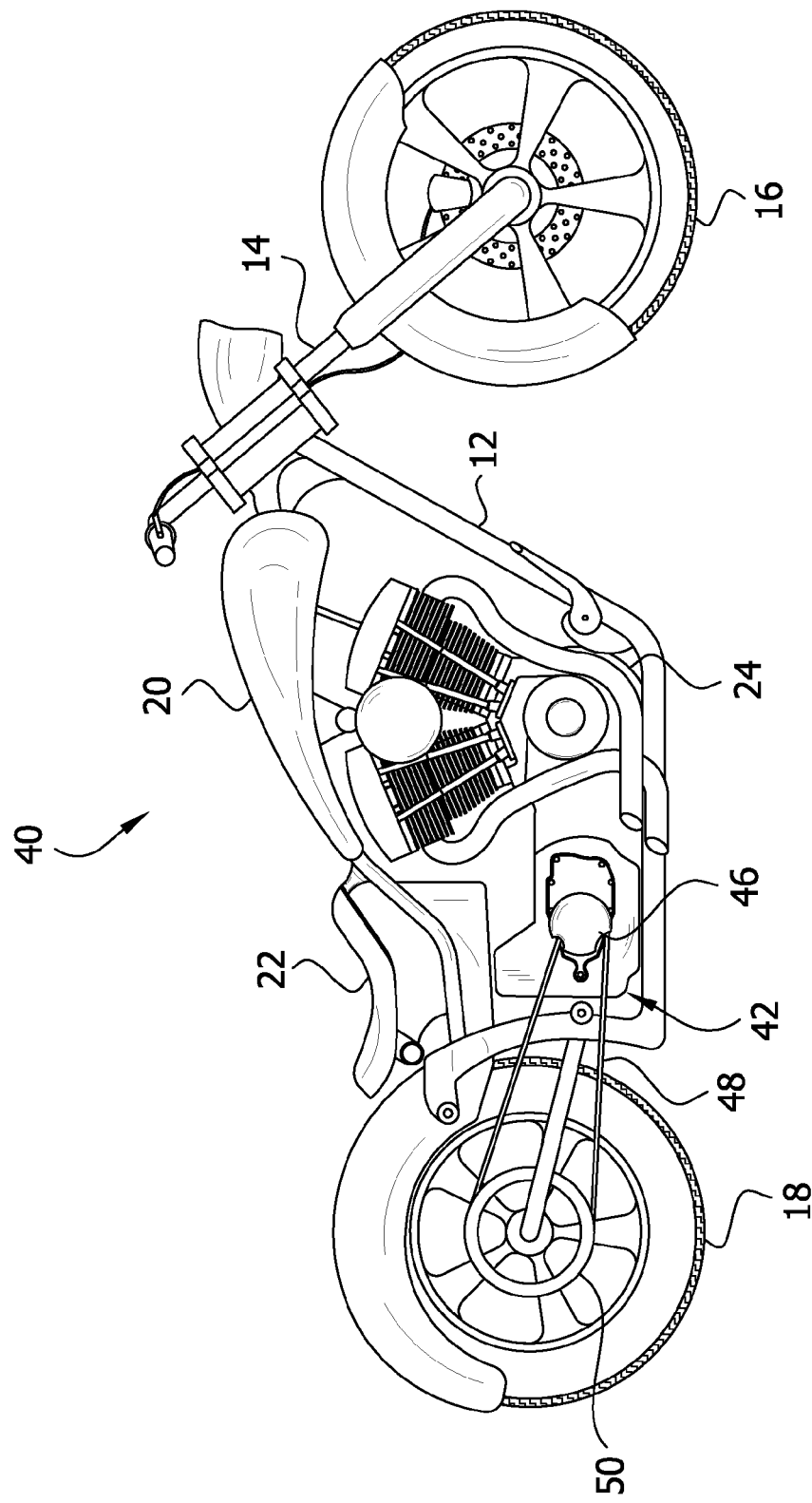
FIG. 3 is a right side elevation of the motorcycle of the present invention.

FIG. 3 shows a right side elevation of the motorcycle 40 having the transmission assembly 42 of the present invention including the hidden brake system. As shown in FIG. 3, the transmission assembly 42 includes an output sprocket 46 that drives a chain 48. The chain 48 drives a gear 50 mounted on the hub of the rear wheel 18 in a conventional manner, making the rear wheel a drive wheel that moves the motorcycle 40 as it turns. As will be apparent to those skilled in the art, the chain and gears may be replaced by a belt and pulleys, a drive shaft, or any other conventional mechanism used to connect a motorcycle transmission to a driven wheel. Because other features of the motorcycle 40 visible in FIG. 3 are conventional and well known, they will not be described in further detail.

Figure 4:
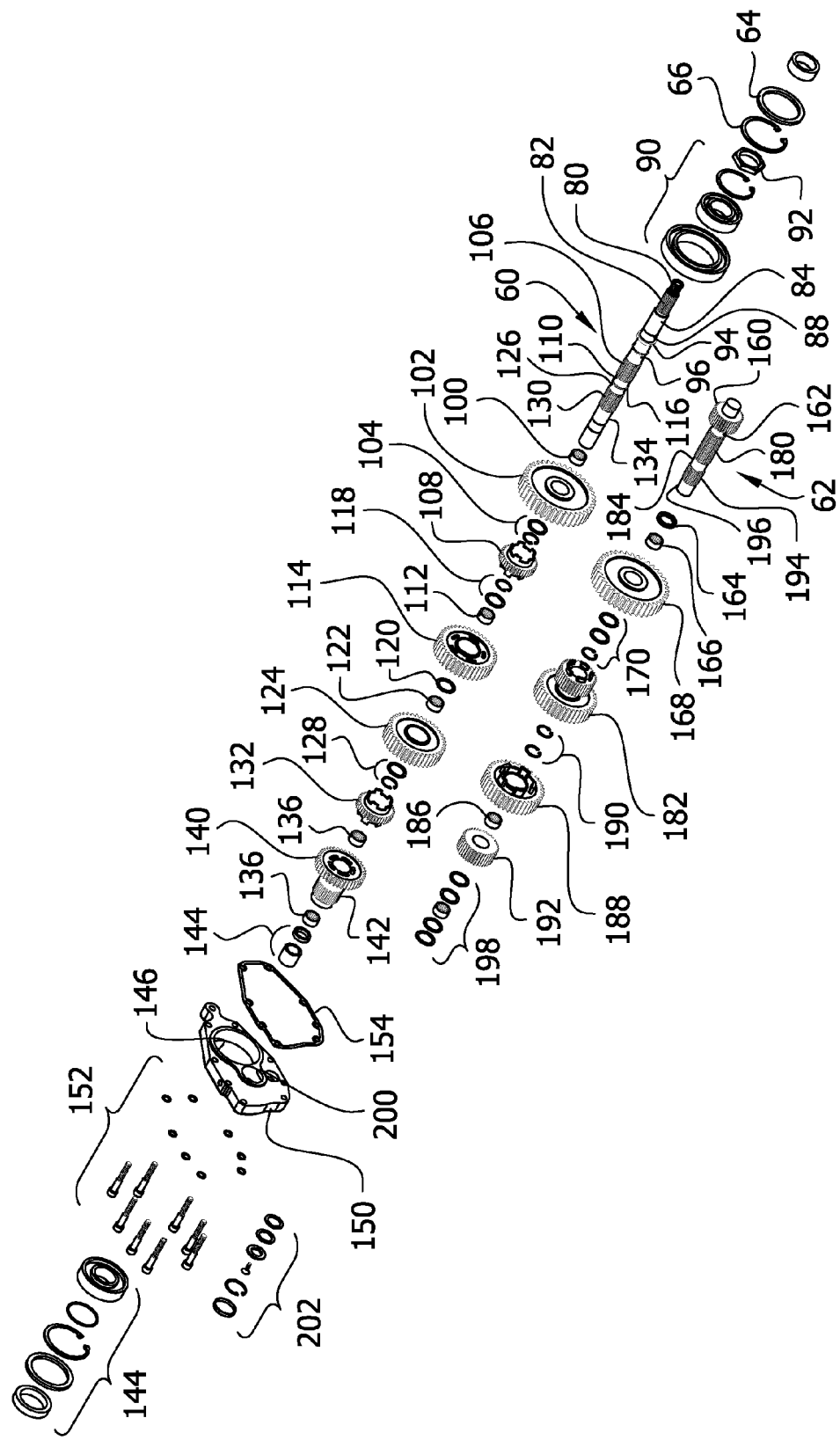
FIG. 4 is a separated perspective of a prior art motorcycle transmission.

FIG. 4 illustrates the parts inside a conventional six-speed right-side-drive motorcycle transmission 30 (FIG. 1). The transmission 30 includes a main shaft, generally designated by 60, and a counter shaft, generally designated by 62, rotatably mounted in a hollow interior of the transmission housing 32. In one embodiment, the main shaft 60 and a crank shaft inside the motor 24 rotate in one direction and the counter shaft 62 rotates in an opposite direction. The main shaft 60 extends through a seal assembly, generally designated by 64, held in the housing 32 by a retaining ring 66. As further illustrated in FIG. 4, the main shaft 60 has threads 80 at one end. An input spline 82 is provided adjacent the threads 80 to engage the primary drive 26 as described above with respect to FIG. 1 to operatively connect the transmission 30 to the motor 24. Thus, the spline 82 constitutes an input of the transmission 30. A pulley or gear inside the primary drive 26 is held on the spline 82 by a nut (not shown) fastened to the threads 80. An unfinished portion 84 of the main shaft 60 adjacent the spline 82 is provided to space the pulley or gear of the primary drive 26 from the transmission housing 32 and to align the pulley with a corresponding pulley mounted on the motor 24.

As further shown in FIG. 4, a short finished land 88 is provided adjacent the unfinished portion 84 of the main shaft 60 for receiving a bearing assembly, generally designated by 90, to support the input end of the main shaft 60. A nut 92 holds the bearing assembly 90 in place against a collar 94 provided at one end of the short land 88. Another finished land 96 formed on an opposite side of the collar 94 receives a needle bearing 100 and a sixth gear 102 so the gear freely rotates on the main shaft 60. The sixth gear 102 is held in position against the collar 94 by a thrust washer and retaining ring combination 104 that fits in a corresponding groove (not shown) in the main shaft 60. A long spline 106 is formed on the shaft 60 adjacent the groove. A castellated first gear 108 is slidably received on the long spline 106 so lugs on the gear selectively mesh with corresponding slots on adjacent gears as will be understood by those skilled in the art to lock the gears together so they turn together with the main shaft 60. As will be appreciated by those skilled in the art, the lugs and slots may be switched (i.e., the first gear may have the slots and the adjacent gears the lugs) without departing from the scope of the present invention. A short finished land 110 provided on the shaft 60 next to the spline 106 receives a needle bearing 112 and a fourth gear 114 so the gear freely rotates on the main shaft 60. The bearing 112 and gear 114 abut a collar 116 provided on the shaft 60 next to the short land 110. The bearing 112 and gear 114 are held in position against the collar 116 by a thrust washer and retaining ring combination 118 that fits in a corresponding groove (not shown) in the main shaft 60. A thrust washer 120, a needle bearing 122, and a third gear 124 engage the opposite side of the collar 116 and are received on a short finished land 126 provided beside the collar so the gear freely rotates on the main shaft. A combination 128 of a thrust washer and retaining ring received in a corresponding groove (not shown) in the main shaft 60 holds the third gear 124 in position on the short land 126. A long spline 130 is formed on the shaft 60 adjacent the groove. A castellated second gear 132 is slidably received on the long spline 130 so lugs on the gear selectively mesh with corresponding slots on adjacent gears so the meshed gears turn together with the main shaft 60 when the second gear contacts. As before, the lugs and slots may be switched without departing from the scope of the present invention. A finished land 134 provided on the shaft 60 next to the spline 130 receives two needle bearings 136. A fifth gear 140 having a hollow stub shaft is mounted on the bearings 136 so the gear and stub shaft freely rotate on the main shaft 60. The hollow stub shaft includes a spline 142 to which the output sprocket 46 (FIG. 3) that drives the rear wheel 18 is attached. Thus, the stub shaft forms an output of the transmission 40. A series of seals, bushings, bearings, inserts, and retainers 144 support the end of the shaft 60 in an opening 146 in an end plate 148, commonly referred to as a trap door, fastened the transmission housing 32 with bolts and washers 152. A gasket 154 is provided to seal the end plate 148 against the housing 32 so the transmission 30 can be flooded with oil to lubricate the gears.

The counter shaft 62 is also rotatably mounted in the transmission housing 32. The shaft 62 has an integral sixth gear 160 that meshes with the sixth gear 102 mounted on the main shaft. A short land 162 adjacent the gear 160 receives a spacer 164, a needle bearing 166, and a first gear 168 that selectively meshes with the first gear 108 mounted on the main shaft 60. The first gear 168 is held in position against the sixth gear 160 by a combination 170 of thrust washers and a retaining ring that fits in a corresponding groove (not shown) in the counter shaft 62. A long spline 180 is formed on the shaft 62 adjacent the groove. A castellated third-fourth gear 182 is slidably received on the long spline 180 so lugs on the gear selectively mesh with corresponding slots on adjacent gears so the meshed gears turn with the counter shaft 62 as will be understood by those skilled in the art. Again, the lugs and slots may be switched without departing from the scope of the present invention. The third-fourth gear 182 selectively meshes with the third and fourth gears, 124, 114, respectively, on the main shaft 60. A short land 184 provided on the shaft 62 next to the spline 180 receives a needle bearing 186 and a second gear 188. The bearing 186 and gear 188 abut a thrust washer and retaining ring combination 190 held in a grove formed in the spline 180. A wide fifth gear 192 is fastened to the counter shaft 62 by a corresponding spline 194 on the shaft. The fifth gear 192 on the counter shaft 62 meshes with the fifth gear 140 on the main shaft 60. A short land 196 is formed on the counter shaft 62 next to the spline 194. A combination 198 of thrust washers and a needle bearing are positioned on the land 196 to support the counter shaft 62 in an opening 200 in the end plate 148. A group 202 of washers, covers, and fasteners cover an opposite end of the hole 200. A conventional selector mechanism (not shown) selectively moves one or more gears mounted on the splines so they engage adjacent gears to mesh the gears on the main shaft 60 with the gears on the counter shaft 62 so the output spline 142 turns at a predetermined rate with respect to the input spline 82. As the manufacture and operation of the transmission are well within the skill of those of ordinary skill in the art, they will not be described in further detail.

Figure 5:
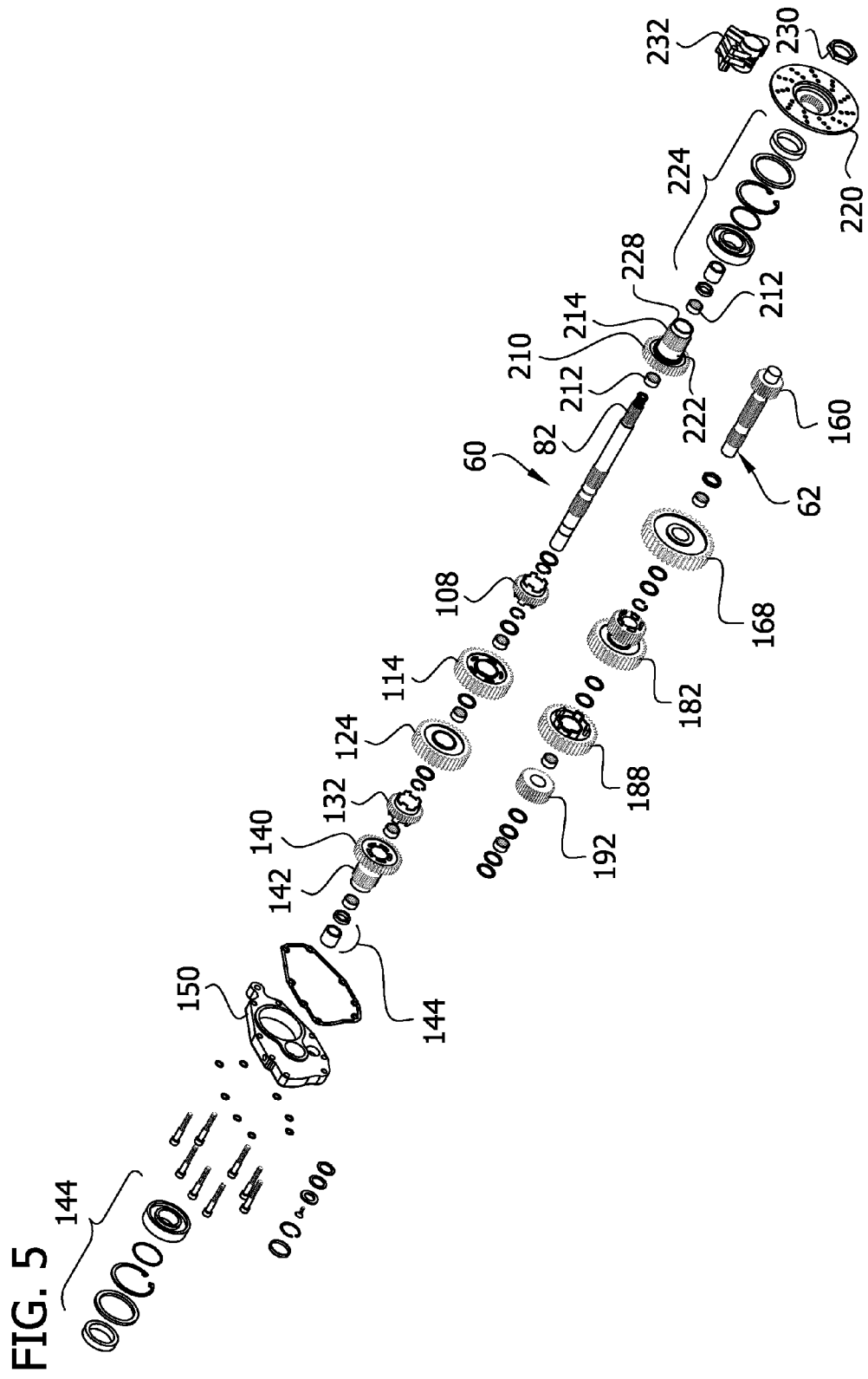
FIG. 5 is a separated perspective of a motorcycle transmission of the present invention.

FIG. 5 illustrates parts inside a six-speed right-side-drive motorcycle transmission and brake assembly 42 (FIG. 2) of the present invention. The transmission and brake assembly 42 is similar to the conventional transmission 30 except that the main shaft 60 is modified and different parts are used between the thrust washer and retaining ring combination 104 and the spline 82 at the input end of the main shaft. The conventional main shaft 60 is modified by removing the collar 94 and land 88, and by machining the unfinished portion 84 the shaft so the shaft has a constant diameter between the spline 106 and the spline 82.

Figure 6:
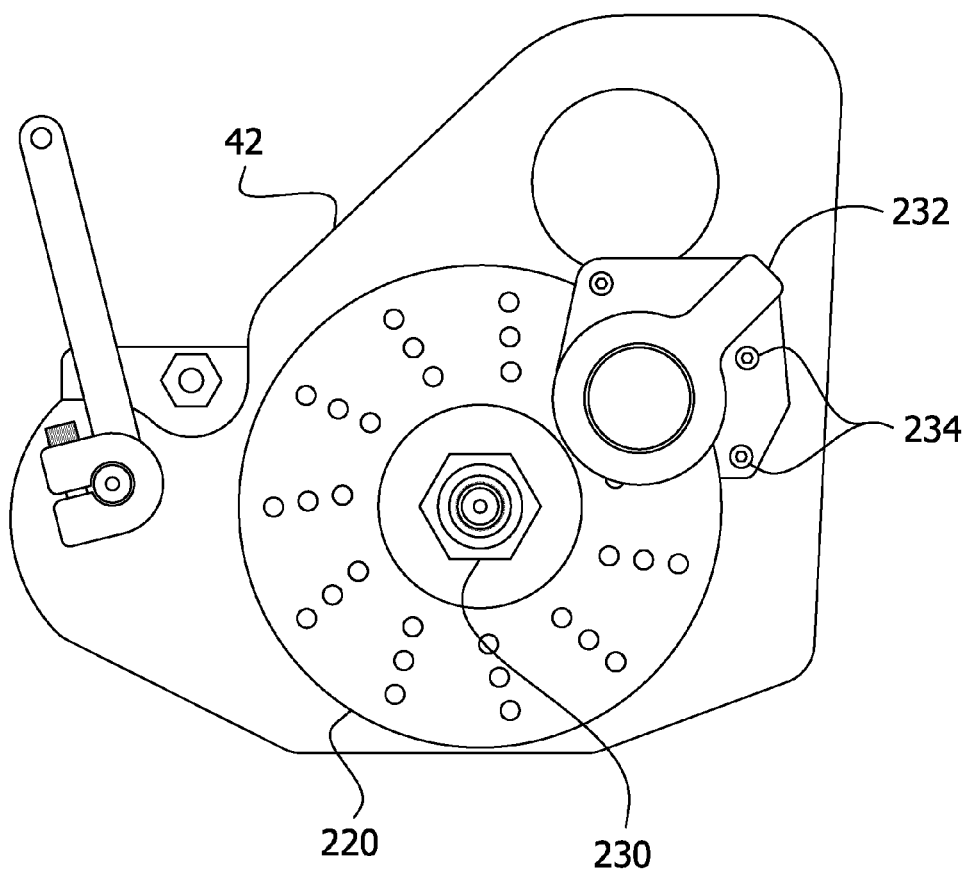
FIG. 6 is a left side elevation of a transmission having a brake rotor and caliper.

As further illustrated in FIG. 5, the sixth gear 102 is replaced with a sixth gear 210 having a hollow stub shaft. The gear 210 is mounted on a pair of bearings 212 so the gear rotates freely on the shaft 60. The hollow stub shaft of the sixth gear 210 includes a spline 214 to which a brake disc 220 is mounted. A short land 222 is provided on the stub shaft between the gear 210 and the spline 214 for receiving a sealed bearing assembly 224 for supporting the shaft 60 in the transmission housing 44. Threads 228 are provided at the end of the shaft adjacent the spline 216 for receiving a nut 230 to hold the brake disc 220 in place on the spline 214 of the stub shaft. As shown in FIG. 6, a brake caliper 232 is mounted on the transmission housing 42 adjacent the disc 220 with fasteners 234. Although the caliper 232 is mounted on the transmission housing 42 in one embodiment, those skilled in the art will appreciate that the caliper 232 may be mounted directly on the motorcycle frame 12 without departing from the scope of the present invention. The caliper 232 is connected to a remote actuator reservoir (not shown) in a conventional manner. As other portions of the transmission and brake assembly are similar to those known in the art, they will not be described in further detail. In use, the disc 220 and caliper 232 are hidden under the cover of the primary drive 32 (FIG. 2) so the brake system is hidden.

As will be appreciated by those skilled in the art, the brake spline 214 and sixth gear 210 on the main shaft 60 always turn together. Further, the brake spline 214 rotates freely with respect to the input spline 82 on the main shaft 60. Thus, when the brake caliper 232 slows the disc 220, the main shaft sixth gear 210 slows but the input spline spines freely. Therefore, applying the brake does not slow the motor 24, which might cause it to stall. Moreover, the counter shaft sixth gear 160 always meshes with the main shaft sixth gear 210, the counter shaft fifth gear 192 always meshes with the main shaft fifth gear 140, and the counter shaft fifth and sixth gears always rotate with the counter shaft 62. Thus, slowing the main shaft sixth gear 210 necessarily slows the counter shaft sixth gear 160, the counter shaft 62, the counter shaft fifth gear 192, and the main shaft fifth gear 140. As the output shaft spline 142 turns with the main shaft fifth gear 140, slowing the disc 220 slows the output shaft spline. Therefore, the output shaft spline 142 slows when the brake is applied regardless of which gear ratio the transmission gearing set in. Accordingly, the transmission and brake assembly 42 permits motorcycle braking regardless of gear ratio without lugging the motor 24.

In addition to the features and benefits described above, the transmission and brake assembly 42 of the present invention permits the input spline 82 and output spline 142 to be spaced by a standard distance so that the system may be used with conventional primary drives and wheel setups. Further, simple changes can be made to the assembly 42 to permit wider rear tires to be mounted on the motorcycle.

Still further, the transmission and brake system 42 of the present invention can be modified for use in a vehicle having three or more wheels, or a vehicle having multiple or independently driven wheels. The system 42 also can be used on a motorcycle having a rear wheel supported only on one side by its frame.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A motorcycle transmission assembly comprising:
   a transmission housing having a hollow interior;
   a gear train including a plurality of selectively meshable gears mounted in the hollow interior of the transmission housing, said train including an input operatively connectable to a motor of the motorcycle, a main shaft rotatably mounted in the hollow interior of the transmission housing for rotation in a first direction, a counter shaft rotatably mounted in the hollow interior of the transmission housing for rotation in a second direction opposite said first direction, and an output operatively connectable to a drive wheel of the motorcycle;
   a hollow stub shaft connected to one gear of said plurality of gears in the gear train, said one gear being rotatably mounted on the main shaft
   a brake rotor having opposite faces mounted on the hollow stub shaft in a position between the input and the one gear that is mounted on the hollow stub shaft, operatively connected to the output of the gear train to apply braking torque to the output via at least one gear of said plurality of gears of the train; and
   a brake caliper fixedly mounted with respect to the transmission housing having opposing brake pads, each of said brake pads being positioned on a corresponding one of said brake rotor faces, the brake pads being selectively moveable between a running position in which the pads are spaced from the rotor faces and a braking position in which the pads engage the rotor faces to resist rotation of said gear of said plurality of gears and thereby resist rotation of the output of the gear train by transmitting the braking torque through said gear of said plurality of gears of the train.

2. An assembly as set forth in claim 1 wherein the brake rotor is positioned on a side of the housing opposite the output.

3. An assembly as set forth in claim 1 wherein the input comprises a spline formed on one end of the main shaft.

4. An assembly as set forth in claim 1 wherein the output comprises a hollow stub shaft joined to said gear of said plurality of gears in the gear train, said stub shaft having a spline formed thereon.

5. An assembly as set forth in claim 4 wherein the one gear to which the hollow stub shaft is joined is rotatably mounted on the main shaft.

6. An assembly as set forth in claim 1 wherein the brake caliper is mounted directly on the transmission housing.

7. An assembly as set forth in claim 1 in combination with a motorcycle frame, motor, and wheel.

8. A motorcycle transmission assembly comprising:
a transmission housing having a hollow interior;
a main shaft rotatably mounted in the hollow interior of the transmission housing, said main shaft having a plurality of main shaft gears mounted thereon and an input operatively connectable to a motor of the motorcycle;
a hollow stub shaft joined to one main shaft gear of said plurality of main shaft gears;
a counter shaft extending parallel to the main shaft rotatably mounted in the hollow interior of the transmission housing, said counter shaft having a plurality of counter shaft gears mounted thereon, each of said plurality of counter shaft gears being selectively meshable with the main shaft gears to change a speed ratio of the transmission;
an output operatively connected to a predetermined gear of said plurality of counter shaft gears;
a brake rotor mounted on the hollow stub shaft in a position between the input and the one main shaft gear to which the brake rotor is mounted, said brake rotor having opposite faces operatively connected to the predetermined gear of said plurality of counter shaft gears via at least one other gear selected from the group consisting of the plurality of main shaft gears and the plurality of counter shaft gears; and
a brake caliper fixedly mounted with respect to the transmission housing and including opposing brake pads, each of said brake pads being positioned on a corresponding one of said brake rotor faces, the brake pads being selectively moveable between a running position in which the pads are spaced from the rotor faces and a braking position in which the pads engage the rotor faces to resist rotation of the output by transmitting braking torque through the predetermined gear of said plurality of counter shaft gears via said at least one other gear.

9. An assembly as set forth in claim 8 wherein the brake rotor is positioned on a side of the housing opposite the output.

10. An assembly as set forth in claim 8 wherein the input comprises a spline formed on one end of the main shaft.

11. An assembly as set forth in claim 8 wherein the output comprises a hollow stub shaft joined to one main shaft gear of said plurality of main shaft gears.

12. An assembly as set forth in claim 8 wherein the brake caliper is mounted directly on the transmission housing.

13. An assembly as set forth in claim 8 wherein the plurality of main shaft gears and the plurality of counter shaft gears are adapted to provide six different gear ratios.

14. An assembly as set forth in claim 8 in combination with a motorcycle frame, motor, and wheel.

* * * * *